United States Patent
Akiba

(10) Patent No.: US 6,522,513 B1
(45) Date of Patent: Feb. 18, 2003

(54) BACK-ELECTROMOTIVE FORCE PROTECTION CIRCUIT

(75) Inventor: Akihiro Akiba, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/431,253

(22) Filed: Nov. 1, 1999

(30) Foreign Application Priority Data

Nov. 2, 1998 (JP) ............................................. 10-312353

(51) Int. Cl.$^7$ ................................................ H02H 9/00
(52) U.S. Cl. .............................. 361/58; 307/39; 307/87
(58) Field of Search ............................ 361/54–56, 58, 361/59, 86; 307/38, 39, 85, 86, 87; 363/50, 74, 75

(56) References Cited

U.S. PATENT DOCUMENTS 5,357,157 A   10/1994   Throngnumchai ............ 307/570
6,169,675 B1 * 1/2001 Shimamori et al. ............ 363/70

FOREIGN PATENT DOCUMENTS

| JP | 63-81630 | 5/1988 | ............ H02H/7/20 |
| JP | 1-91619 | 4/1989 | ............ H02H/7/12 |
| JP | 4-170815 | 6/1992 | ......... H03K/17/687 |
| JP | 7-271459 | 10/1995 | ............ G05F/1/56 |

* cited by examiner

*Primary Examiner*—Ronald W. Leja

(57) ABSTRACT

A back-electromotive force protection circuit that is able to protect circuit components other than a hard disc against the back-electromotive force generated in the hard disc. A back-electromotive force protection circuit includes a power source 10, a hard disc 20 having a positive side terminal connected via a connection line 22 to the positive side terminal of the power source 10 and having Ma negative side terminal connected via connection lines 24, 26 to the negative side terminal of the power source 10, a load 30 provided between the connection line 22 and the connection line 24 and a FET 40 for turning off the connection lines 24, 26 if no power is supplied from the power source 10.

13 Claims, 1 Drawing Sheet

BACK-ELECTROMOTIVE FORCE PROTECTION CIRCUIT

FIELD OF THE INVENTION

This invention relates to a back-electromotive force protection circuit. More particularly, it relates to a back-electromotive force protection circuit in which the circuit is protected against the back-electromotive force generated during startup or halting of a hard disc provided on a personal computer or an engineering work station.

BACKGROUND OF THE INVENTION

Recently, as the computer processing capability is improved, the amount of handled data is increased drastically. On the other hand, as the application software is diversified and improved in the functions of the application software, the scale of the application itself is increased. As an example, in a certain software, such as a word processor, as a type of the application, the size of the application exceeding 200 MB is not uncommon.

As a device for storing the large-scale application or a large amount of data, hard discs are routinely used in order to cope with demands in readout and writing speeds.

FIG. 2 shows connection of a conventional hard disc.

In FIG. 2, 50 is a power source, and 52 a hard disc. The hard disc 52 has its positive side terminal connected to a positive side terminal of a power source 50 via a connection line 56, while having its negative side terminal connected to a negative side terminal of the power source 50 via a connection line 58.

In the figure 54 is a load connected across the connection lines 56 and 58. The load 54 is, for example, a control circuit for the hard disc 52. This load 54 and the hard disc 52 are actuated by the power supplied via the connection lines 56, 58.

SUMMARY OF THE DISCLOSURE

However, the following problems have been encountered in the course of investigations toward the present invention.

In the conventional device, shown in FIG. 2, there lacks a circuit for protecting the load 54 from a back-electromotive force BV generated upon startup or halting of the hard disc 52, such that, if the hard disc 52 generates the back-electromotive force, there is the possibility that the back-electromotive force be applied to components other than the hard disc 52, such as load 54, thus deteriorating the electrical performance or disabling the intended operation of these components.

The same problems would arise for any driving mechanism or unit driven by the power source, e.g., CD drive etc.

In view of the above-described status of the art, it is an object of the present invention to provide a back-electromotive force protection circuit that is capable of protecting circuit components against the back-electromotive force produced in the hard disc or in general a power-driven unit.

It is another object of the present invention, to provide a protection circuit against back-electromotive force with a simplified structure.

Other objects will become apparent in the entire disclosure.

According to one aspect of the present invent ion, there is provided a back-electromotive force protect ion circuit. The protect circuit is characterized by a power source, a hard disc (or power-driven unit) having a positive side terminal connected via a first connection line to the positive side terminal of the power source and having a negative side terminal connected via a second connection line to the negative side terminal of the power source, a load provided between the first connection line and the second connection line and line breaking means or element which turns off the second connection line if no power is supplied from the power source.

The present invention is also characterized in that there is provided a resistor which consumes the back-electromotive force generated from the hard disc between the line breaking means and the hard disc.

The present invention is also characterized in that line breaking means is a FET having its gate connected to the first connection line.

Other features or aspects of the present invention are also mentioned in the appended claims which disclosure is herein incorporated by reference thereto.

PREFERRED EMBODIMENTS OF THE INVENTION

Figure 1:
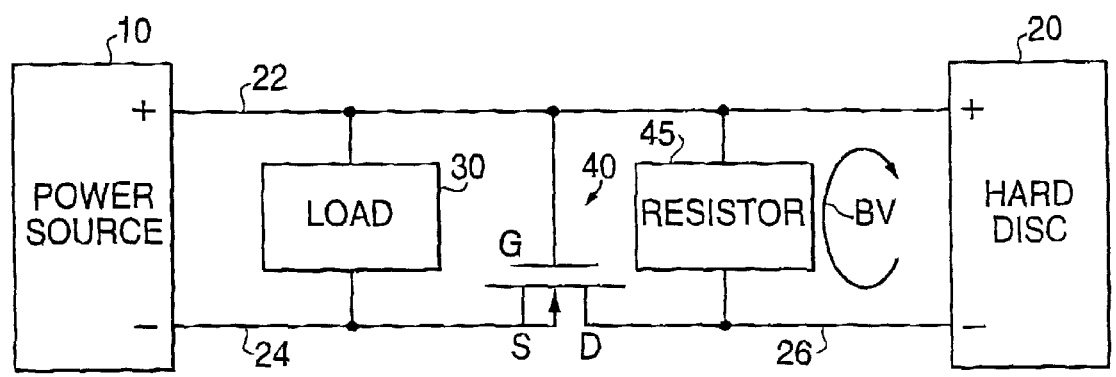
FIG. 1 is a block diagram showing the configuration of a back-electromotive force protection embodying the present invention.
Figure 2:
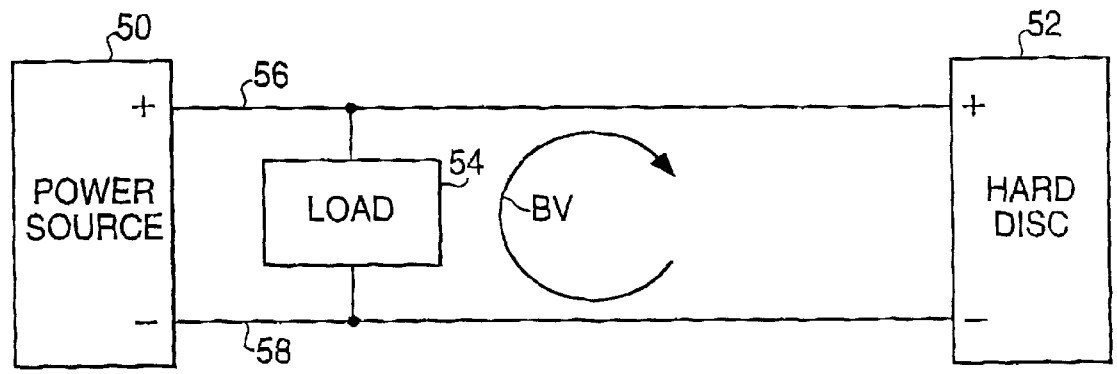
FIG. 2 shows the connection of a conventional hard disc device.

Referring to the drawings, a back-electromotive force protection circuit, embodying the present invention, is explained in detail.

FIG. 1 shows a block diagram showing the structure of a back-electromotive force protection circuit embodying the present invention. This back-electromotive force protection circuit is provided within the interior of a personal computer or an engineering workstation.

Referring to FIG. 1, 10 is a power source, and 20 is a hard disc. The hard disc 20 has its positive terminal connected to a positive side terminal of the power source 10 via a connection line 22, while having its negative side terminal connected to the negative side terminal of the power source 10 via a connection line 24, a FET 40, as later explained, and a connection line 26.

In FIG. 1, 30 is a load connected across the connection lines 22 and 24. The load 30 may, for example, be a control circuit for the hard disc 20.

In the present description and the drawings, the term load is used to denote in general an electronic circuit or component consuming power to some extent, rather than a load simply consuming the power.

This load 30 and the hard disc 20 are actuated by the power supplied via the connection lines 22 and 24, FET 40 and the connection line 26.

The FET (field effect transistor) 40 is connected across the connection line 22 and the connection lines 24, 26. A resistor 45 is connected across the connection lines 22 and 26. The FET 40 has its gate G connected to the connection line 22, while having its source S and drain D connected to the connection lines 24, 26, respectively.

If the power source of the personal computer is turned on, the source S and the drain D are in current conducting states.

With the FET 40, if the power of the personal computer is turned on and a steady state is set so that the hard disc 20 is running at a pre-set rpm, the source S and the drain D are in current conducting states.

If the power source of the personal computer is turned off by an operator such that the power ceases to be supplied, the source S and the drain D of the FET 40 are in the non-current conducting states.

The resistor 45 is a dumper resistor for consuming the back-electromotive force generated by the hard disc 20.

If, in the above configuration, the operator turns on the power source of the personal computer, the power is supplied from the power source 10 via the connection lines 22, 24, FET 40 and the connection line 26. Since the power is supplied via the connection line 22, the source S and the drain D of the FET 40 are in the current conducting states, so that the power is supplied from the positive side terminal of the power source 10 to the negative side terminal of the hard disc 20.

If a pre-set time elapses after power on of the power source, the steady state is set. Even in this state, the source S and the drain D of the FET 40 are in the current conducting states, so that the hard disc 20 is run in rotation at a predetermined RPM.

If then the operator turns off the power source of the personal computer, the hard disc 20 continues to be rotated for a few seconds after an internal motor of the hard disc is turned off, so that the back-electromotive force BV is generated from the hard disc 20. However, at a time point when the operator has turned off the power source of the personal computer, the power ceases to be supplied from the power source 10 via the connection line 22, so that the power ceases to be supplied to the gate G of the FET 40. Therefore, the current path between the source S and the drain D of the FET 40 becomes non-current-conducting such that the back-electromotive force BV ceases to be supplied to the load 30.

Since the connection lines 24, 26 are turned off by the FET 40, the back-electromotive force BV generated by the hard disc 20 is consumed by the resistor 45 (i.e., a current caused by the back-electromotive force BV flows through the resistor 45).

T Thus, since the back-electromotive force BV generated by the hard disc 20 ceases to be applied to the load (other component), the latter can be protected against possible destruction. The resistor 45 is disposed downstream of the FET 40, such that the connecting lines 22 and 26 are bypassed between the FET and the hard disc 20.

Although the back-electromotive force protection circuit according to a present embodiment of the present invention has been explained, the present invention can be freely modified within the scope of the invention without being limited to the above-described embodiment. For example, in the above-described embodiment, the back-electromotive force protection circuit is provided within the personal computer or within the engineering workstation, it may also be provided in other equipment provided with hard discs, such as word processors or game machines.

Instead of the hard disc, the present invention may be applied to any power-driven unit likewise e.g., CD-drive or any disc drive which initiates to rotate and stop upon ON- and OFF-turning of the power source.

The meritorious effect of the present invention are summarized as follows.

The back-electromotive force protection circuit according to the present invention, as described above, includes a power source, a hard disc (in general power-driven unit) having a positive side terminal connected via a first connection line to the positive side terminal of the power source and having a negative side-terminal connected via a second connection line to the negative side terminal of the power source, a load provided between the first connection line and the second connection line and line breaking means which turns off the second connection line if no power is supplied from the power source. Therefore, the back-electromotive force generated by the hard disc is not applied to the load, thus reliably protecting the load (other component).

It should be noted that other objects and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A back-electromotive force protection circuit comprising:
    a power source;
    a hard disc having a positive side terminal connected via a first connection line to a positive side terminal of said power source and having a negative side terminal connected via a second connection line to a negative side terminal of said power source;
    a load provided between said first connection line and said second connection line; and
    line breaking means for turning off said second connection line if no power is supplied from said power source, wherein said line breaking means is positioned in between said load and said hard disc.

2. The back-electromotive force protection circuit according to claim 1, wherein there is provided a resistor which consumes the back-electromotive force generated from said hard disc between said line breaking means and said hard disc.

3. The back-electromotive force protection circuit according to claim 1, wherein said line breaking means is a FET having its gate connected to said first connection line.

4. A back-electromotive force protection circuit comprising:
    a power source;
    a power-driven unit having a positive side terminal connected via a first connection line to a positive side terminal of said power source and having a negative side terminal connected via a second connection line to a negative side terminal of said power source;
    a load provided between said first connection line and said second connection line; and
    line breaking element which turns off said second connection line if no power is supplied from said power source, wherein said line breaking element is positioned in between said load and said power-driven unit.

5. The back-electromotive force protection circuit according to claim 4, wherein there is provided a resistor which consumes the back-electromotive force generated from said power-driven unit between said line breaking element and said power-driven unit.

6. The back-electromotive force protection circuit according to claim 4, wherein said line breaking element is a FET having its gate connected to said first connection line, with its source and drain being connected to and interposed in said second connection line.

7. The back-electromotive force protection circuit according to claim 5, wherein said line breaking element is a FET having its gate connected to said first connection line, with its source and drain being connected to and interposed in said second connection line.

8. A back-electromotive force protection circuit comprising:

a power source;

a power-driven unit having a first side terminal connected via a first connection line to a first side terminal of said power source and having a second side terminal connected via a second connection line to a second side terminal of said power source;

a load provided between said first connection line and said second connection line; and a line breaking element which turns off said second connection line if no power is supplied from said power source, wherein said line breaking element is positioned in between said load and said power-driven unit.

9. The back-electromotive force protection circuit according to claim 8, wherein there is provided a resistor which consumes the back-electromotive force generated from said power-driven unit between said line breaking element and said power-driven unit, said resistor being connected between the first and second connection lines downstream of said line breaking element.

10. The back-electromotive force protection circuit according to claim 8, wherein said line breaking element is a FET having its gate connected to said first connection line, with its source and drain being connected to and interposed in said second connection line.

11. The back-electromotive force protection circuit according to claim 9, wherein said line breaking element is a FET having its gate connected to said first connection line, with its source and drain being connected to and interposed in said second connection line.

12. The back-electromotive force protection circuit according to claim 8, wherein said line breaking element is connected across the first and second connection lines downstream of said load.

13. The back-electromotive force protection circuit according to claim 8, wherein said power-driven unit comprises a hard disc.

* * * * *